United States Patent
Sun et al.

(10) Patent No.: US 11,941,708 B2
(45) Date of Patent: Mar. 26, 2024

(54) METHOD, APPARATUS, DEVICE AND MEDIUM FOR POSTING A VIDEO OR IMAGE

(71) Applicant: Beijing Zitiao Network Technology Co., Ltd., Beijing (CN)

(72) Inventors: Hui Sun, Beijing (CN); Daoyu Wang, Beijing (CN); Chenqi Liang, Beijing (CN); Xiaoshuang Bai, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/147,131

(22) Filed: Dec. 28, 2022

(65) Prior Publication Data

US 2023/0137850 A1    May 4, 2023

Related U.S. Application Data

(63) Continuation of application No. PCT/CN2021/119907, filed on Sep. 23, 2021.

(30) Foreign Application Priority Data

Sep. 25, 2020 (CN) .......................... 202011026973.4

(51) Int. Cl.
*G06Q 50/00* (2012.01)
*G06F 3/04842* (2022.01)
(Continued)

(52) U.S. Cl.
CPC ......... *G06Q 50/01* (2013.01); *G06F 3/04842* (2013.01); *G06T 11/60* (2013.01);
(Continued)

(58) Field of Classification Search
CPC ........... H04N 1/00167; H04N 1/00159; H04N 1/00413; H04N 1/0044; H04N 23/632;
(Continued)

(56) References Cited

U.S. PATENT DOCUMENTS 9,633,462 B2 *   4/2017   Gross ................... G06V 10/255
11,218,639 B1 *  1/2022   Walker ................. H04N 23/633
(Continued)

FOREIGN PATENT DOCUMENTS

| CA | 2808184 A1 * | 9/2013 | ........... G06F 3/0481 |
| CN | 104322050 A | 1/2015 | |

(Continued)

OTHER PUBLICATIONS

ISA China National Intellectual Property Administration, International Search Report Issued in Application No. PCT/CN2021/119907, dated Oct. 29, 2021, WIPO, 3 pages.
(Continued)

*Primary Examiner* — Abdelaaziz Tissire
(74) *Attorney, Agent, or Firm* — Alleman Hall & Tuttle LLP

(57) ABSTRACT

The embodiments of the present disclosure relate to a method and an apparatus a device, and a medium for posting a video or image. In one exemplary method, present a capturing interface comprising a capturing user interface element. In response to detecting activation of the capturing user interface element in the capturing interface, generate a captured video or image and displaying an editing interface for editing the captured video or image, the editing interface comprising a posting user interface element for posting the captured video or image. In response to detecting activation of the posting user interface element, post the captured video or image. The user may quickly post a captured video by means of a story or a quick post function, being beneficial
(Continued)

to increasing the positivity of the user to participate in the creation of short video and increasing user stickiness.

17 Claims, 13 Drawing Sheets

(51) Int. Cl.
*G06T 11/60* (2006.01)
*H04N 1/00* (2006.01)
*H04N 23/63* (2023.01)
*H04N 23/667* (2023.01)
*H04N 101/00* (2006.01)

(52) U.S. Cl.
CPC ..... *H04N 1/00159* (2013.01); *H04N 1/00413* (2013.01); *H04N 1/0044* (2013.01); *H04N 1/00472* (2013.01); *H04N 23/632* (2023.01); *H04N 23/667* (2023.01); *H04N 2101/00* (2013.01); *H04N 2201/007* (2013.01); *H04N 2201/0084* (2013.01); *H04N 2201/0096* (2013.01)

(58) Field of Classification Search
CPC ............. H04N 23/667; H04N 2101/00; H04N 2201/007; H04N 2201/0084; H04N 2201/0096; H04N 23/62; H04N 1/00408–00472; G06T 11/40–80; G06T 11/60; G06T 1/00; G06T 1/0007; G06T 2201/00; G06T 2200/24; G06F 3/0484–0486; G06F 3/04842; G06F 3/048–04897; G06F 3/005; G06F 3/0416; G06Q 50/01; G06Q 50/10; H04L 51/32; G03G 13/34; G03G 15/36; G03G 2215/0426

See application file for complete search history.

(56) References Cited

U.S. PATENT DOCUMENTS

| | | | |
|---|---|---|---|
| 2007/0234214 A1 | 10/2007 | Lovejoy et al. | |
| 2009/0319897 A1* | 12/2009 | Kotler | H04N 1/6013 715/838 |
| 2013/0055088 A1* | 2/2013 | Liao | H04N 1/00161 715/810 |
| 2013/0121614 A1* | 5/2013 | Intwala | G06T 5/009 382/280 |
| 2015/0253970 A1* | 9/2015 | Cheng | G06T 5/00 715/765 |
| 2015/0281591 A1* | 10/2015 | Yahyavi | G11B 27/031 348/576 |
| 2016/0216871 A1 | 7/2016 | Stamatiou | |
| 2017/0060485 A1* | 3/2017 | Krilivsky | G06F 3/04845 |
| 2021/0168473 A1* | 6/2021 | Li | H04N 21/47205 |

FOREIGN PATENT DOCUMENTS

| | | | | |
|---|---|---|---|---|
| CN | 107092426 A | | 8/2017 | |
| CN | 108833787 A | * | 11/2018 | ......... H04N 5/23216 |
| CN | 108833787 A | | 11/2018 | |
| CN | 110049266 A | | 7/2019 | |
| CN | 110868639 A | | 3/2020 | |
| CN | 111221457 A | | 6/2020 | |
| CN | 111246272 A | | 6/2020 | |
| CN | 111343074 A | | 6/2020 | |
| CN | 112153288 A | | 12/2020 | |
| CN | 110868639 B | | 3/2021 | |
| JP | 2017175242 A | | 9/2017 | |
| JP | 2017204148 A | | 11/2017 | |
| JP | 2020039085 A | | 3/2020 | |
| WO | 2020125292 A1 | | 6/2020 | |

OTHER PUBLICATIONS

"How to use the snapshot of Tiktok where is the snapshot of Tiktok," Baidu, Available Online at https://jingyan.baidu.com/article/7c6fb428cd5a8780642c903c.html, Jan. 16, 2019, 7 pages.

European Patent Office, Extended European Search Report Issued in Application No. 21871545.6, dated Oct. 31, 2023, Germany, 10 pages.

Japan Patent Office, Office Action Issued in Application No. 2023504476, dated Jan. 23, 2024, 12 pages.

"Montage Make a Video," Mac Fan, retrieved on Jan. 23, 2024, 14 pages.

"Download the video using "MyTube"," iPhone&iPad Benricho, retrieved on Jan. 23, 2024, 2 pages.

* cited by examiner

METHOD, APPARATUS, DEVICE AND MEDIUM FOR POSTING A VIDEO OR IMAGE

CROSS-REFERENCE TO RELATED APPLICATIONS

The present application is a continuation of International Application No. PCT/CN2021/119907, filed on Sep. 23, 2021, which claims priority to Chinese patent application No. 202011026973.4, filed on Sep. 25, 2020, both of which are hereby incorporated by reference in their entireties.

FIELDS

Embodiments of the present disclosure relate to the field of computers, and more particularly, to a method, apparatuses, electronic devices, and computer-readable storage media for posting a video or image.

BACKGROUND

With the popularity of mobile terminals and the continuous improvement of network access speed, short videos have gradually gained the favor of mobile terminal users because of their characteristics of short time and strong entertainment and so on. Each user of the mobile terminal may be either a receiver of information or a creator and a poster of the information, which significantly promotes the positivity of the user to participate in the creation of short video. However, in the known solution, the processes for the user to create and post the short videos are cumbersome, which reduces the user experience and is not conducive to further enhancing the positivity of the user to participate in the creation of the short video.

SUMMARY

In a first aspect, a method for posting a video or image is provided. The method comprises: presenting a capturing interface comprising a capturing user interface element; in response to detecting activation of the capturing user interface element in the capturing interface, generating a captured video or image; displaying an editing interface for editing the captured video or image, the editing interface comprising a posting user interface element for posting the captured video or image; and in response to detecting activation of the posting user interface element, posting the captured video or image.

In a second aspect, an apparatus for posting a video or image is provided. The apparatus comprises: a presenting module configured to present a capturing interface comprising a capturing user interface element; a generating module configured to in response to detecting activation of the capturing user interface element in the capturing interface, generate a captured video or image; a first displaying module configured to display an editing interface for editing the captured video or image, the editing interface comprising a posting user interface element for posting the captured video or image; and a first posting module configured to in response to detecting activation of the posting user interface element, post the captured video or image.

In a third aspect, an electronic device is provided. The electronic device comprises: a processor; and a memory for storing a computer program, the computer program being executed by the processor to implement the method according to the first aspect.

In a fourth aspect, a computer-readable storage medium is provided. The computer-readable storage medium storing a computer program thereon, wherein the computer program is executed by a processor to implement the method according to the first aspect.

According to the embodiments of the present disclosure, a story or a quick post function is enabled, thereby facilitating the user to quickly post the captured video, which is beneficial to further improve the positivity of the user to participate in the creation of short video and increasing user stickiness.

It should be understood that the matters described in this Summary are neither intended to limit key or critical features of the embodiments of the present disclosure, nor intended to limit the scope of the present disclosure. Other features of the present disclosure will become easier to understand from the following description.

BRIEF DESCRIPTION OF THE DRAWINGS

The above and other features, advantages and aspects of the implementations of the present disclosure will become more apparent in combination with the accompanying drawings and with reference to the following detailed description. In the drawings, the same or similar drawings indicate the same or similar elements, where.

DETAILED DESCRIPTION

The concepts of the present disclosure will now be described with reference to various exemplary embodiments illustrated in the accompanying drawings. It should be understood that these embodiments are described only to enable those skilled in the art to better understand and further implement the present disclosure, and are not intended to limit the scope of the present disclosure in any way. It should be noted that in practical cases, similar or identical reference numbers may be used in the figures, and similar or identical reference numbers may refer to similar or identical elements. Those skilled in the art will understand, from the following description, that alternative embodiments of the structures and/or methods described herein may be employed without departing from the principles and concepts of the present disclosure as described.

In the context of the present disclosure, the term "comprises" and its variants are to be considered as open terms that mean "comprises, but is not limited to"; The term "based on" is to be considered as "based at least in part on"; the term "an embodiment" may be understood as "at least one implementation"; the term "another embodiment" may be understood as "at least one other embodiment". Other terms that may appear but are not mentioned here, unless explicitly stated, should not be interpreted or defined in a way that is inconsistent with the concept on which the embodiments of the present disclosure are based.

Figure 1:
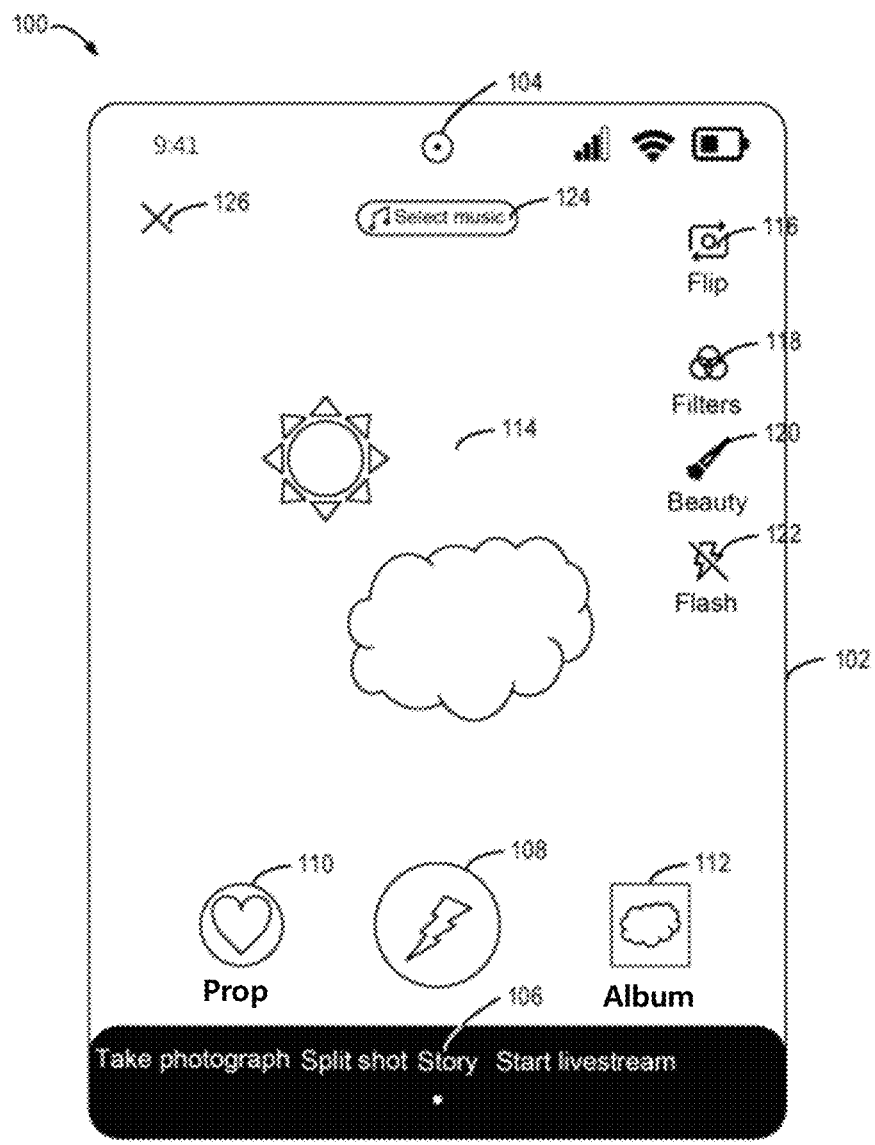
FIG. 1 illustrates an exemplary user interface of an electronic device according to some embodiments of the present disclosure.

FIG. 1 illustrates an exemplary user interface of an electronic device 100 according to some embodiments of the present disclosure. Electronic device 100 may be a cellular phone, a portable electronic device, a tablet computer, and so in. As shown in FIG. 1, the electronic device 100 comprises a display 102. The display 102 may be implemented by a technology of liquid crystal display (LCD), a technology of organic light emitting diode (OLED), or a technology of mini LED. In some other embodiments, the display 102 also may be implemented by the other technologies. The display 102 may receive information to be displayed from a processor or the like of the electronic device 100 and provide a visual output to a user according to the received information to be displayed. The visual output may comprise graphics, text, icons, video, and any combination thereof. For example, a portion of the visual output in the user interface may correspond to user interface elements, for example, keys, icons, and the like.

In some embodiments, the display 102 may be implemented by a touch-sensitive display that provides an input and output interface between the electronic device 100 and a user. A touch-sensitive display may sometimes be referred to as a "touch screen" for convenience. The display 102 may comprise a touch-sensitive surface, sensors, and/or sensor arrays that receive input from a user based on haptics. These sensors may detect contact or proximity on the display 102 and translate the detected contact into interactions with user interface elements on the display 102. It should be understood that the display 102 may be implemented using a variety of touch sensing technologies now known or later developed, including but not limited to capacitive, resistive, and surface acoustic wave technologies. In some embodiments, a user may interact with the display 102 using a finger or a touch pen.

As shown in FIG. 1, the electronic device 100 further comprises a camera 104, also called a reflector, disposed in the display 102. The camera 104 is disposed on the front of the electronic device 100 and is a front camera, which is convenient for the user to create a selfie. The camera layout shown in FIG. 1 is a "hole screen" layout. In some other embodiments, the electronic device 100 may also use other suitable layouts such as, a non-full screen layout or a "pop-up" layout. In addition to the camera 104, the electronic device 100 may also comprise one or more cameras (not shown) disposed on the back, i.e., a rear camera, such that an enhanced capturing capability is provided. The user can click on the user interface element 116 to switch between the front camera and the rear camera.

As shown in FIG. 1, the display 102 presents the capturing interface of the application for video or image sharing. The application may comprise a plurality of capturing modes, and FIG. 1 exemplarily shows four capturing modes, "Take photograph", "Split shot", "Story" and "Start livestream". For example, in the "Take photograph" mode, the user may capture and post a photo; in the "Split shot" mode, the user may capture and post a short video that does not exceed a certain duration (for example, 10 seconds, etc.); in the "Story" mode, the user may quickly capture and post a video; in the "Start livestream" mode, the user may make a livestream by opening a live room. It should be understood that the application may also provide more or fewer capturing modes. The user may select different capturing modes by manners such as clicking or sliding. For example, a user may click on a user interface element (for example, text or icon) corresponding to a capture mode to select the corresponding capture mode. In another example, the user also may slide left and right along the display to select a corresponding capturing mode.

As indicated by the indicator at the Story user interface element 106, the Story mode of the application is activated. In the Story mode, the user may activate the capturing user interface element 108 to capture the video. For example, the user may click on the capturing user interface element 108 to initiate capturing of the video. If the user wants to stop the capturing of the video, the user may click the capturing user interface element 108 again to stop the capturing of the video. In another example, the user may click the capturing user interface element 108 to initiate the capturing of the video. If the user wants to stop the capturing of the video, the user may cease the pression on the capturing user interface element 108 to stop the capturing of the video. It should be understood that "click" and "press" represent an abstraction of contact or proximity, and do not imply or suggest a specific sensing manner. The video generated during the capturing process can be presented in real time in the capturing interface, as the shown video 114. In some embodiments, the video generated during the capturing process may also be stored in the storage device of the electronic device 100 in real time or in the storage device after the capturing is completed.

As shown in FIG. 1, the capturing interface also comprises a prop user interface element 110, and the user may click on the prop user interface element 110 to enter into a prop interface (not shown). The prop interface may present various magical emoji, stickers, scenes, role-playings and other functions to improve the enjoyment and interactivity of capturing the video. After the user selects the prop, the prop may be presented in the video 114 during capturing the video.

Figure 6:
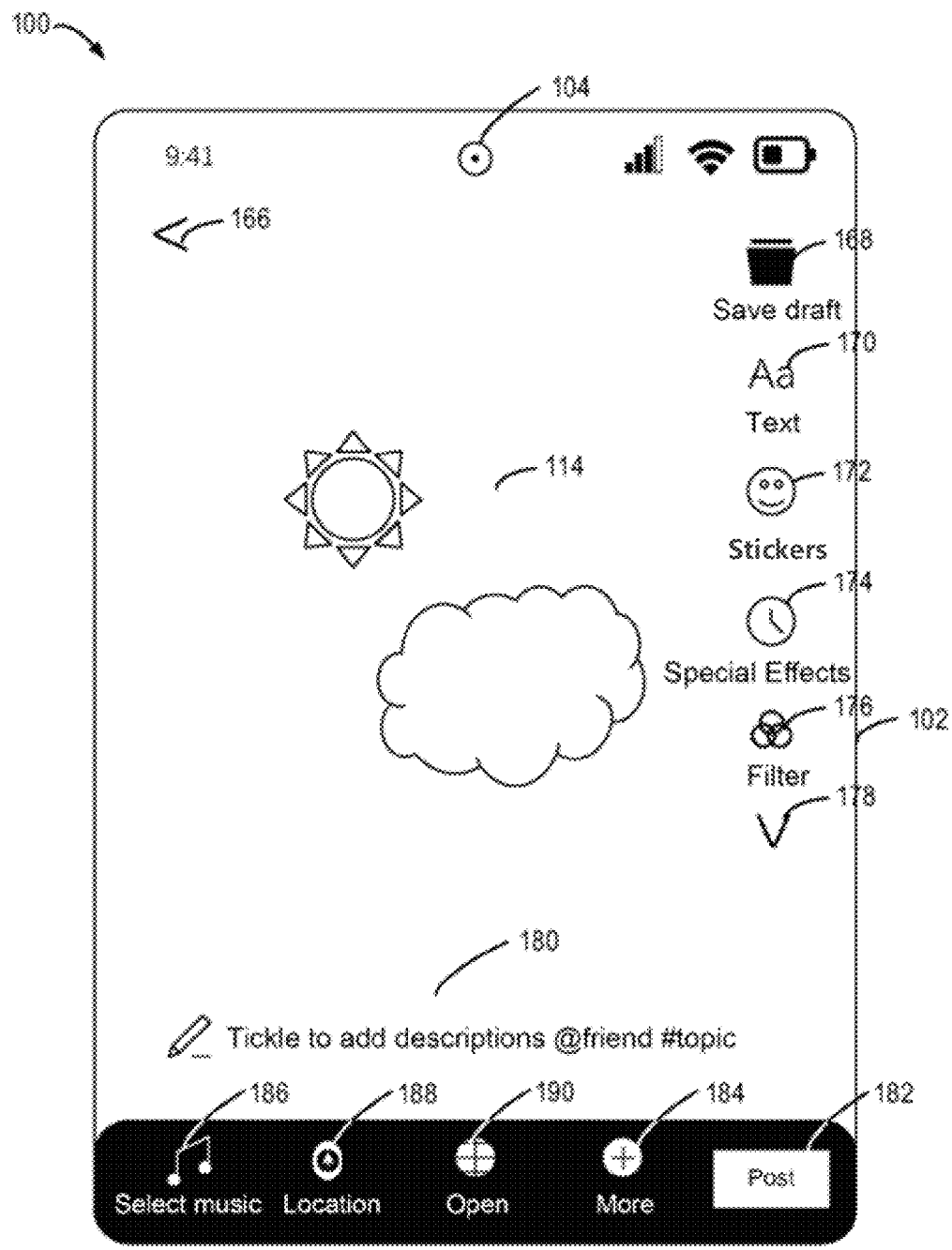
FIG. 6 illustrates an exemplary user interface of an electronic device according to some embodiments of the present disclosure.
Figure 11:
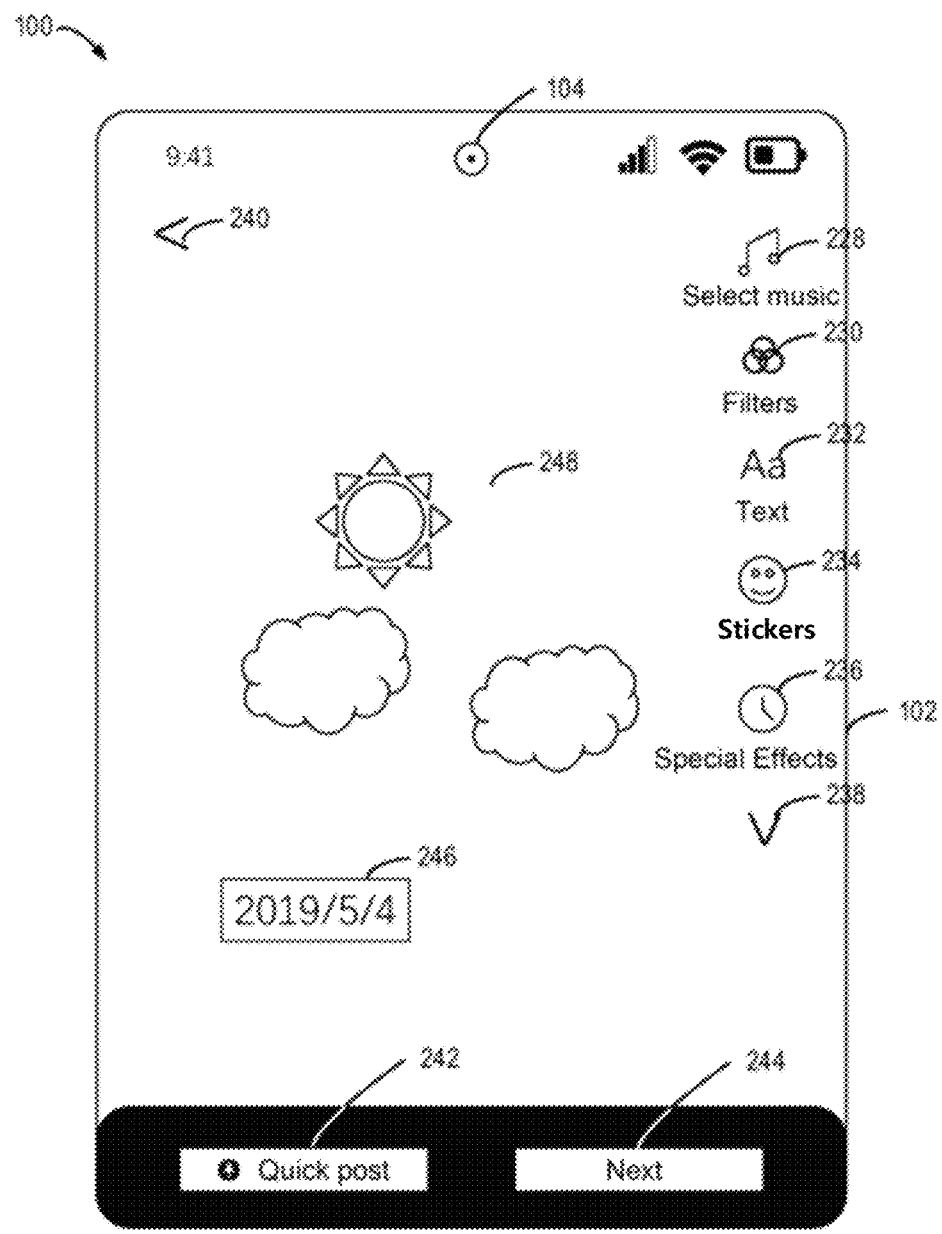
FIG. 11 illustrates an exemplary user interface of an electronic device according to some embodiments of the present disclosure.

The capturing interface also comprises an album user interface element 112, and the user may click to enter into the album of the user. The album may be a local album of the electronic device 100, or a cloud album of the user, or a combination of the local album and the cloud album. The user may select one or more videos and/or one or more images in the album, edit and post. For example, after the user selects these videos and/or images, the electronic device 100 may jump to a user interface as shown in FIG. 2, FIG. 6 or FIG. 11.

In the capturing interface as shown in FIG. 1, the user may click on the user interface element 126 to exit the Story mode to enter into other user interfaces of the application, for example, the starting page. The user may click on the music selection user interface element 124, and the user may click on the music selection user interface element 124 to select a soundtrack for the video. In addition, the capturing interface also comprises a filter user interface elements 118, a beauty user interface elements 120, and a flash user interface element 122. The user may click the filter user interface element 118 to select a filter to use when capturing the video, click the beauty user interface element 120 to select a beauty functions such as beautification, or click the flash user interface element 122 to adjust the on-off state of the flash. It should be understood that the capturing interface may provide more or fewer editing user interface elements.

Figure 2:
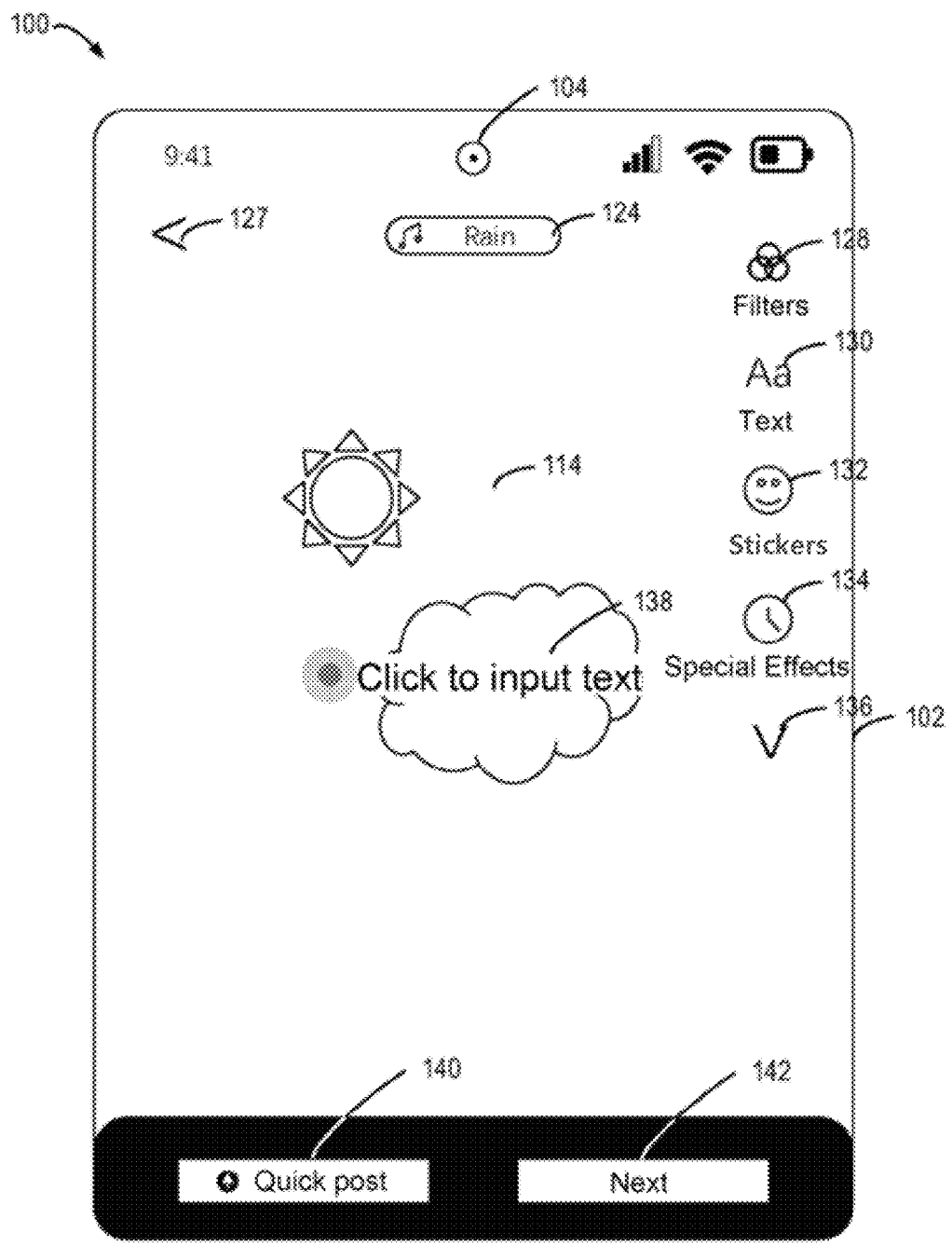
FIG. 2 illustrates an exemplary user interface of an electronic device according to some embodiments of the present disclosure.

After the user finishes capturing the video, the capturing interface shown in FIG. 1 will be switched to the editing interface shown in FIG. 2. The video 114 may be presented in the editing interface, for example, a portion or all of the video 114 may be played in a loop. As shown in FIG. 2, the editing interface may include multiple editing user interface elements, for example, a filter user interface elements 128, a text user interface elements 130, a sticker user interface elements 132, a special effect user interface elements 134, and so on. The user may edit the video 114 with these editing user interface elements. For example, the user may click on the filter user interface element 128 to adjust the filter of the video 114, click the text user interface element 130 to add text to the video 114, click the sticker user interface element 132 to add a sticker to the video 114, or click the special effect user interface element 134 to apply the special effect to the video 114. In addition, the user may click on the user interface element 136 to expand more editing user interface elements to obtain more editing functions. It should be understood that the editing interface may provide more or fewer editing user interface elements. These editing functions may be applied to the total video or to a portion of the video, for example, one or more video frames.

As shown in FIG. 2, the user may select music at music selection user interface element 124 as the soundtrack to the video, for example, "Rain". In addition, the user also may directly click the text input box 138 to input text instead of operating the text user interface element 130.

If the user is not satisfied with the capturing effect, the user may click the returning back user interface element 127 to return back to the capturing interface, and perform video capturing again. On the other hand, after the user has finished editing the video, the posting user interface element 140 may be clicked to post the edited video. The user may also directly click on the posting user interface element 140 to post the video without performing any editing operations. The posting user interface element 140 may provide a quick posting or one-click posting function, so as to facilitate and quickly post the captured video, which is beneficial to further improve the positivity of the user to participate in the creation of the short video.

Figure 3:
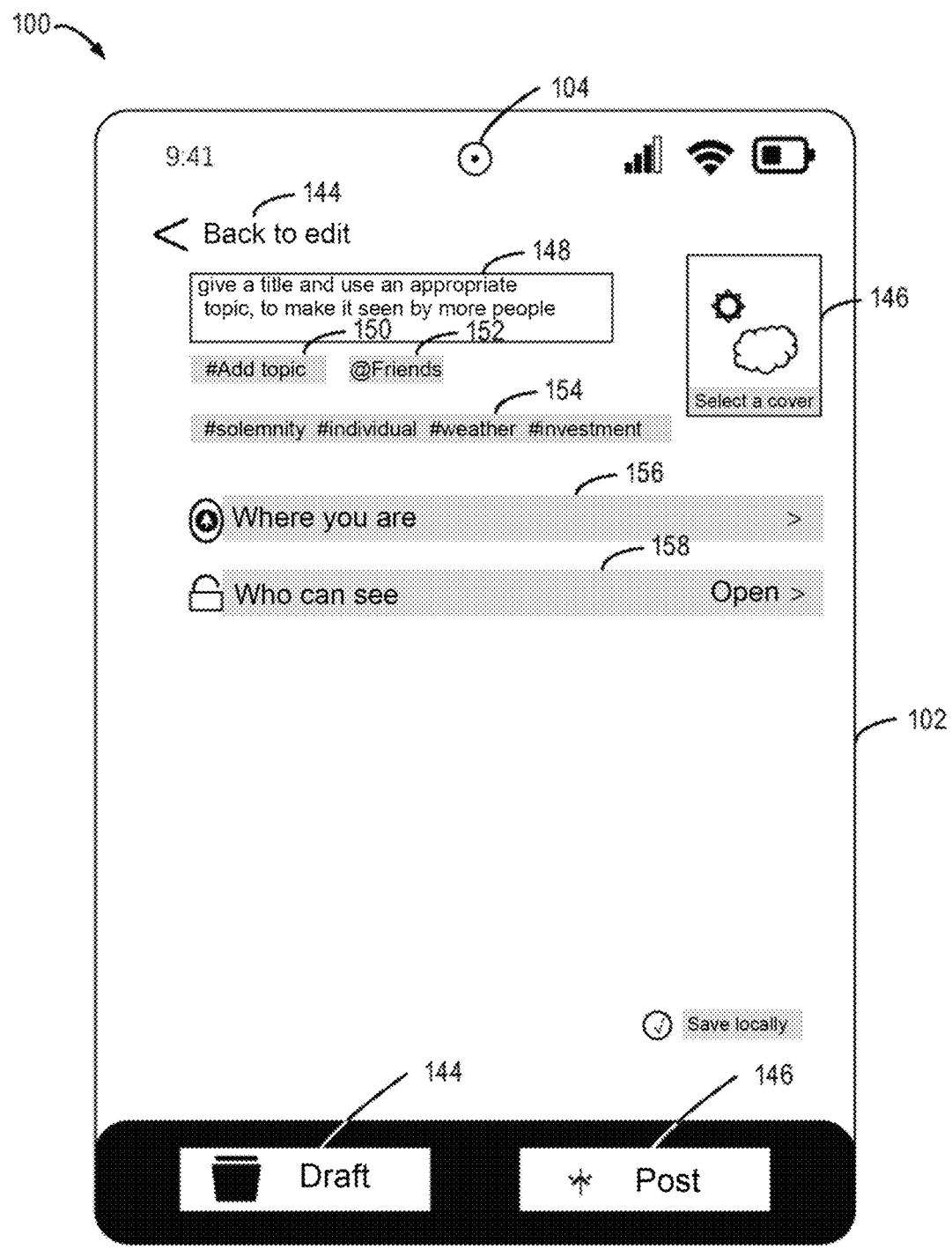
FIG. 3 illustrates an exemplary user interface of an electronic device according to some embodiments of the present disclosure.

The editing interface also provides a switching user interface element 142 for switching to the posting interface for posting the video, as shown in FIG. 3. For example, the user may click on the switching user interface element 142 to switch to the next step of posting the video, i.e., the posting interface shown in FIG. 3. A default cover 146 of the video 114 is shown in the posting interface, and the default cover 146 may be the first frame of the video 114 or one or more other representative frames. The cover may be an image, or may be part of a captured video. The user may click on the "select a cover" user interface element in the default cover 146 to select an appropriate cover. For example, when the user clicks on a "select a cover" user interface element, electronic device 100 may display at least a portion of a video frame of video 114 for the selection of the user. In addition, the electronic device 100 may also display an editing user interface element to facilitate the user to edit the selected cover. Alternatively, or in addition, the electronic device 100 may also provide an interface of a local album and/or a cloud album for the user to select a cover.

The posting interface also shows a text box 148 for adding a title. The user may edit the text box 148 to give a title for the video, and may use metadata tags for interaction to provide enhanced social attributes. For example, the metadata tags may include a "#" interactive tag indicating a topic, an "@" interactive tag indicating an interactive object, and so on. The user may add metadata tags by typing in the text box 148 or by clicking on user interface elements 150,152.

As shown in FIG. 3, the posting interface also may comprise a user interface element for candidate topics 154. The candidate topics 154 may comprise hot topics, such as, hot topics at the location of the user or hot topics in the entire network, such as "solemnity", "individual", and so on. Additionally, the candidate topics 154 also may be topics associated with the video 114, for example, "weather".

The posting interface can also provide one or more posting-related options, such as, selecting a capturing location, selecting a publicity level, whether to save locally, and so on. As shown in FIG. 3, the location user interface element 156 provides an interface for adding location information (for example, a capturing location), and the publicity user interface element 158 provides an interface for setting a publicity degree (for example, whether to disclose, the scope of disclosure).

After selecting the posting related option, the user may select to post the captured video. For example, the user may click on the posting user interface element 146 to post the captured video. If the user hesitates to post the captured video, the user may click on the draft user interface element 144 to save the captured video in the draft box for the subsequent posting. If the user finds that the user is not satisfied with the effect of the video editing, the user may click the returning back user interface element 144 to return back to the editing interface to re-edit the video.

Figure 4:
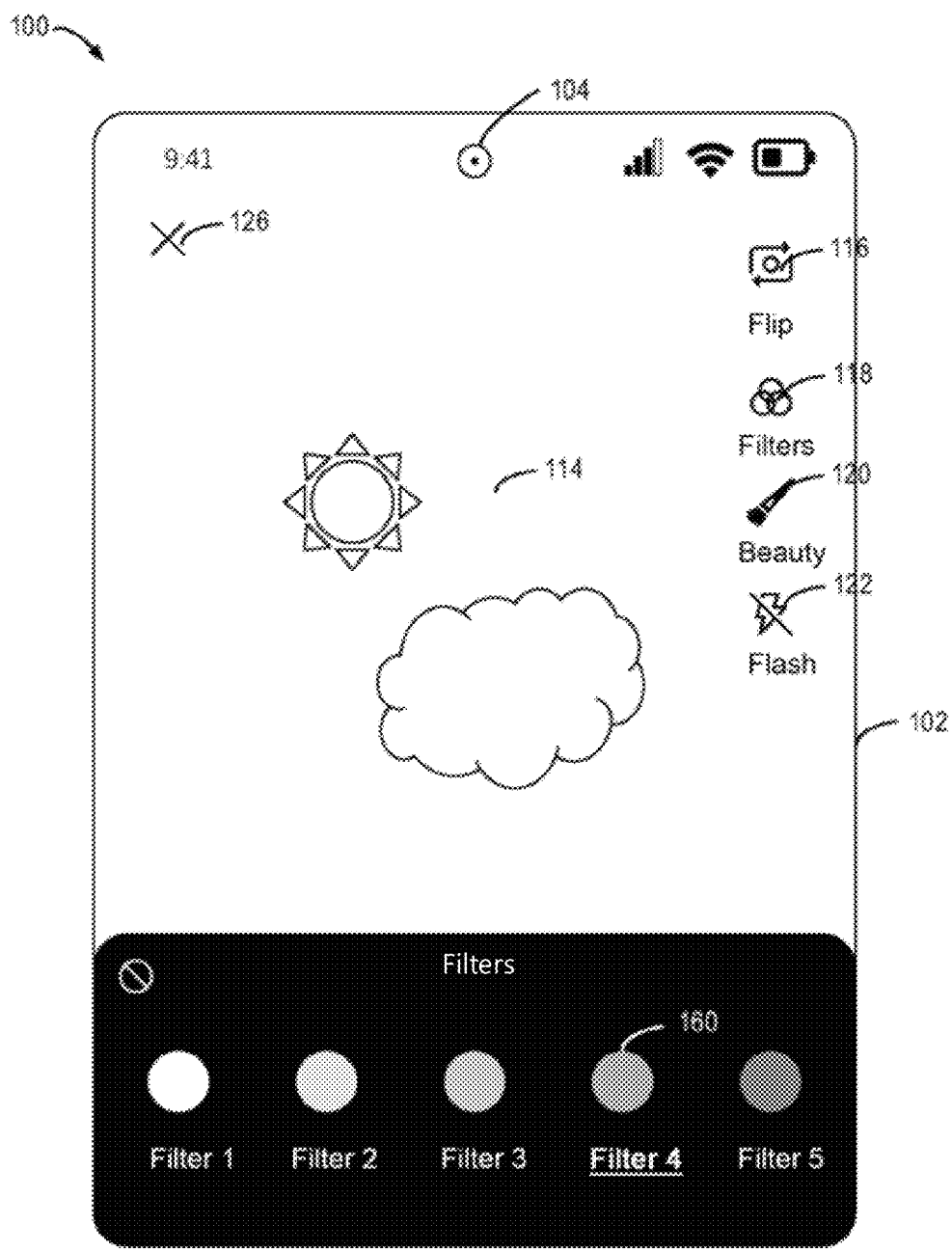
FIG. 4 illustrates an exemplary user interface of an electronic device according to some embodiments of the present disclosure.

FIG. 4 illustrates an exemplary user interface of the electronic device 100 according to some embodiments of the present disclosure. The user interface may be a user interface displayed in response to the user clicking on the filter user interface element 118 as shown in FIG. 1. As shown in FIG. 4, the user interface comprises 5 filters, where the fourth filter 160 is selected. The user may click on different filter user interface elements to select different filters. These filters may be specific to the Story mode and may be not applied to the other modes of the application (for example, Split shot mode). In this way, the user may be prompted to use the Story mode more frequently, such that the user may be adaptable to the Story mode as soon as possible, change the preference of the user, and improve the user stickiness.

These filters may be special filters with more texture. Compared with ordinary pure color filters, these filters may have more texture, light and shadow characteristics, and the displaying effects may be more advanced and consumable.

In some embodiments, the interaction of these filters may have a following-hand effect, that is, as the gesture slides, only a part of the image is covered with the interaction effect of the filter before lifting. After lifting, the whole image is covered with the interactive effect of the filter. In another example, after lifting, only a part of the interactive effect may be covered with the filter.

Figure 5:
FIG. 5 illustrates an exemplary user interface of an electronic device according to some embodiments of the present disclosure.

FIG. 5 illustrates an exemplary user interface of the electronic device 100 according to some embodiments of the present disclosure. The user interface may be a user interface displayed in response to the user clicking on the sticker user interface element 132 as shown in FIG. 2. The user interface may comprise one or more tabs, such as stickers and emoticons. Below the sticker tab, a number of candidate stickers are shown, including metadata tags for interaction, for example, an "@mentions" sticker 162 and a "#topic" sticker 164. If the user selects a sticker, the style of the sticker may be directly displayed on the screen, that is, applied to the video 114. The user may select who he needs to @ or the topics he needs to add. If the @ behavior is successfully completed, the person being @ will receive the relevant notification information; if the #topic is successfully added, the content will also be included in the related topic. Alternatively, or in addition, the user also may use the metadata tag in the mode of text input as shown in FIG. 2. For example, the user may click on the text box 138 to enter @ or #, such that the corresponding type of sticker may be used.

FIG. 6 illustrates an exemplary user interface of the electronic device 100 according to some embodiments of the present disclosure. The user interface may be an editing interface that is switched to in response to the user completing capturing in the capturing interface of FIG. 1. For example, FIG. 6 may be used as an alternative to the editing interface of FIG. 2. The editing interface comprises a plurality of editing user interface elements, for example, saving draft user interface element 168, text user interface element 170, sticker user interface element 172, special effect user interface element 174, filter user interface element 176, and so on. In addition, the user may click on the user interface element 178 to expand more editing user interface elements for additional editing functions. For the sake of brevity, there is no further descriptions of these editing user interface elements.

In addition, the editing interface also comprises a music selection user interface element 186 for selecting background music, a location user interface element 188 for selecting a capturing location, and a publicity user interface element 190 for selecting a publicity degree. In addition, the editing interface also displays a more user interface element 184 for displaying more editing user interface elements. The location user interface element 188 and the publicity user interface element 190 provide substantially the same functionality as location user interface element 156 and publicity user interface element 158 in the posting interface shown in FIG. 3. By integrating the editing function in the posting interface into the editing interface, the user only needs to use the capturing interface and the editing interface to realize posting the video. Compared with the three-step method in FIG. 3, the posting efficiency may be improved and the time cost of the user may be saved.

Figure 7:
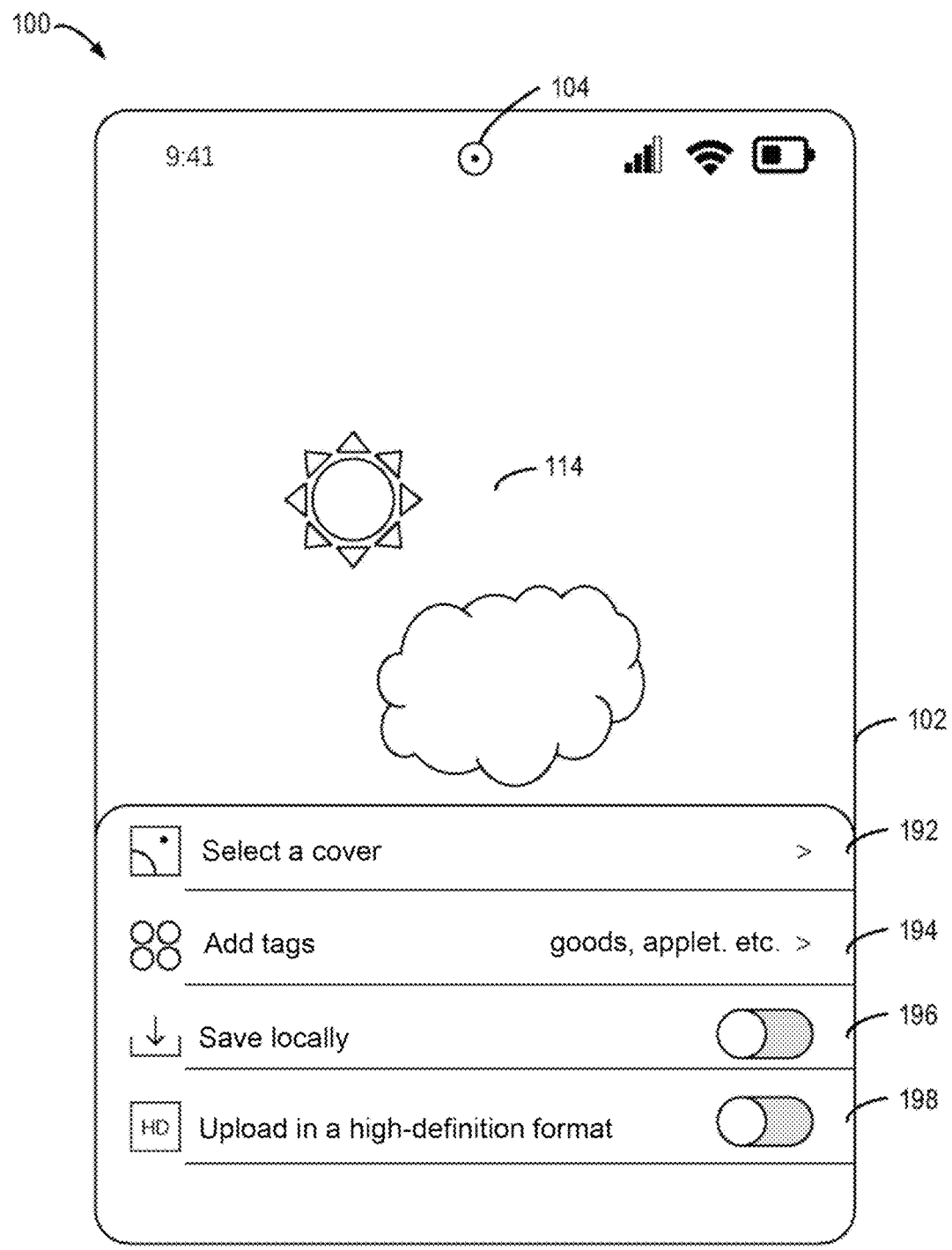
FIG. 7 illustrates an exemplary user interface of an electronic device according to some embodiments of the present disclosure.

If the user clicks on the more user interface element 184, the display 102 may display the user interface shown in FIG. 7. This user interface provides more editing user interface elements as posting options, for example, a user interface element 192 for selecting a cover, a user interface element 194 for adding tags (for example, goods, applets, etc.), a user interface element 196 enabling locally saving function and a user interface element 198 for enabling a high-definition upload function, and so on. Compared with the user interface elements 188 and 189, these user interface elements may have a lower usage frequency. In some examples, according to the usage frequency of the user interface elements, these user interface elements with high usage frequency of the user interface elements may replace user interface elements 188 and 189. For example, if the user would usually modify the cover but would not usually modify the publicity degree when posting a video, the user interface element 190 may be collapsed into the more user interface element 184, such that the user interface element 188 may be replaced by the user interface element 192.

Figure 8:
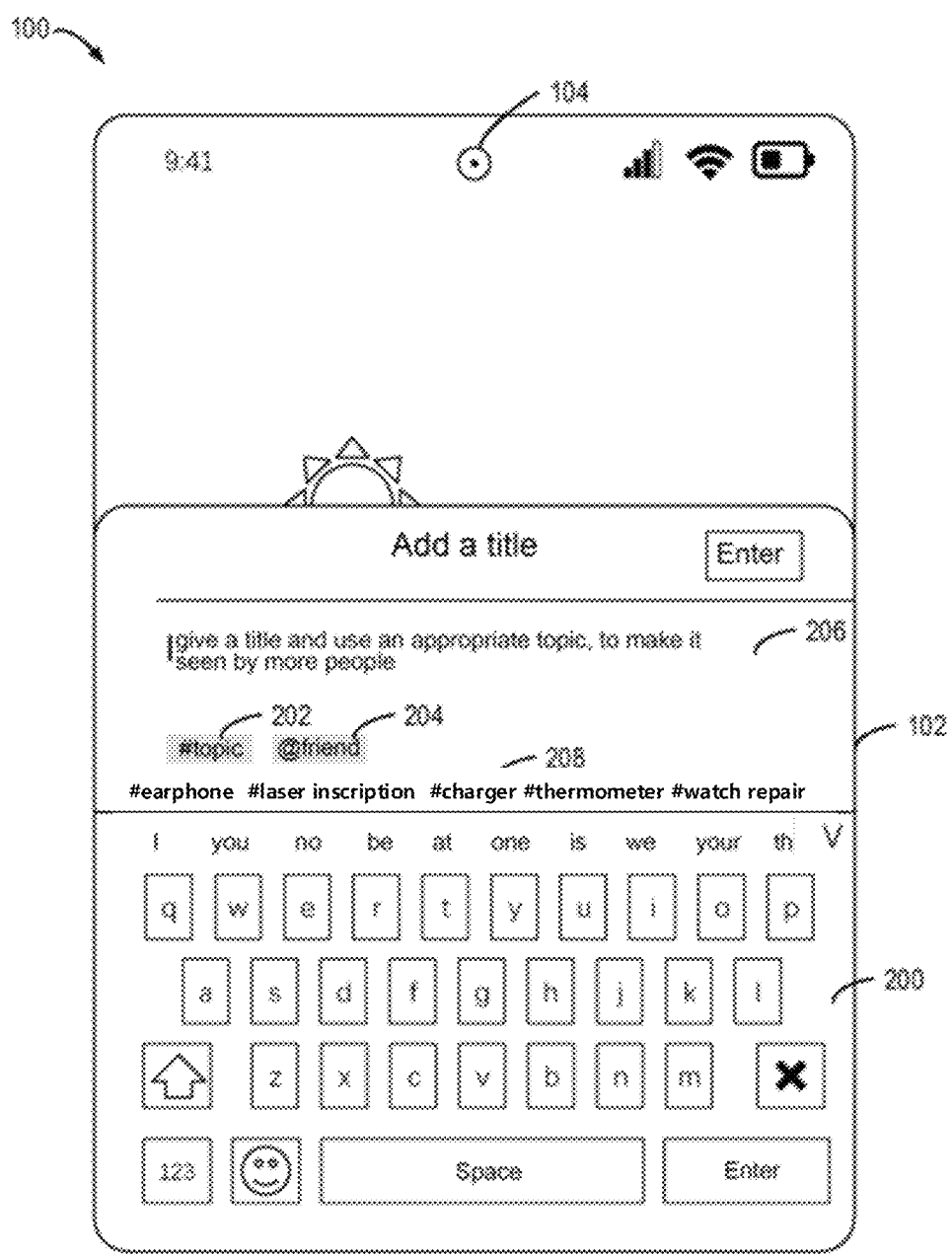
FIG. 8 illustrates an exemplary user interface of an electronic device according to some embodiments of the present disclosure.

Refer back to FIG. 6, which shows a text box 180 for adding a title (the user may click text box 180 to add a title) and metadata tags for interaction, for example, @ or #. FIG. 8 shows the user interface displayed when the user clicks on text box 180, wherein the user interface elements 202, 204 and text box 206 are similar with the user interface elements 150, 152 and text box 148 as shown in FIG. 3, respectively, and thus there is no more descriptions. The user may edit text via the keyboard 200 to add the title and/or the metadata tags.

After selecting the posting related option, the user may select to post the captured video. For example, the user may click on the posting user interface element 182 to post the captured video. If the user hesitates to post the captured video, the user may click on the draft user interface element 168 to save the captured video in the draft box for subsequent posting. If the user is not satisfied with the capturing effect, the user may click the returning back user interface element 166 to return back to the capturing interface as shown in FIG. 1 and perform the video capturing again.

Embodiments for capturing and posting videos have been described above with reference to FIGS. 1 to 8. It should be understood that the above embodiments also may be applied to posting images. For example, as shown in FIG. 1, instead of using the Story mode, "Take photograph" may be clicked to activate the "Take photograph" mode. The "Take photograph" mode of the application also may use the solution described above in conjunction with the embodiments for capturing and posting videos.

Figure 9:
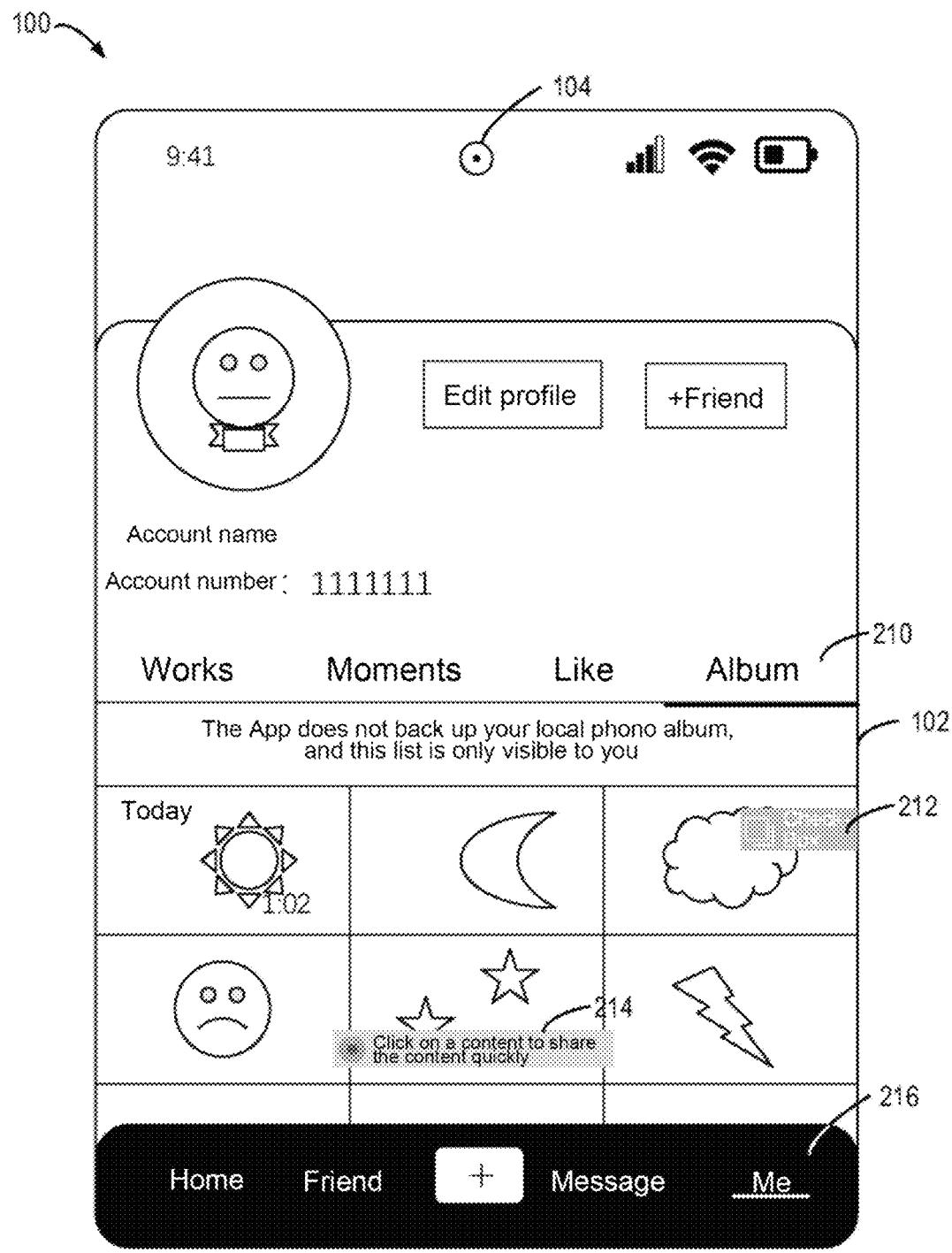
FIG. 9 illustrates an exemplary user interface of an electronic device according to some embodiments of the present disclosure.

FIG. 9 illustrates an exemplary user interface of the electronic device 100 according to some embodiments of the present disclosure. The user interface illustrates a personal home page of the user, where the personal home page user interface element 216 is activated. The personal homepage comprises 4 tag tabs, including: Works, Moments, Like and Album, where the Album tag tab is selected. For example, the personal home page displays only m tabs, for example, 4, and the Album tab may be presented at the nth tab, for example, n=4. If the user already has 4 tabs online, the "Album" tab may not be displayed. The album may be a local album of the electronic device 100 and/or a cloud album of the user.

In the Album tab, the contents of the album may be displayed in chronological order from latest to earliest. For the video in the album, the duration of the video may be displayed, for example, the duration of the video may be displayed at the bottom right of the video, for example, [minutes]:[seconds]. In the album, the covers of the videos may be displayed, for example, one or more frames extracted from the videos. Alternatively, the videos may be played in real time, or the first video being displayed in full may be played. For images such as photos in the album, the photo may be directly displayed or a representative area of the photo may be displayed.

In some embodiments, timestamps for one or more videos or images may be displayed. For example, the timestamp of the first photo in the first row of the current presenting may be displayed. As the album list is slid, the timestamp changes accordingly. For example, show the timestamp of the next photo when the last photo showing the timestamp disappears completely off the screen. In another example, when the portion of the last photo showing the timestamp disappearing from the screen exceeds a predetermined threshold, the timestamp of the next photo is displayed.

The user interface also shows prompt information 214: "Click on a content to share the content quickly", so as to facilitate the user to get a quick start. The user can click on the video or image in the album to enter the editing interface, for example, the editing interface shown in FIG. 2 or FIG. 6. In some embodiments, the editing interface may be associated with a user-selected capture mode. For example, if the user selects the "Story" mode, the user clicks on a video or image in the album to enter into the editing interface as shown in FIG. 2 or FIG. 6. If the user selects the "Split shot" mode, the user clicks on a video or image in the album to enter into an editing interface corresponding to the "Split shot" mode.

In some embodiments, if the duration of the video in the album exceeds the threshold duration of the shared video of the application, the user will enter into the video trimming interface after clicking the cover of the video, and then enter into the editing interface to the corresponding mode after trimming in the video trimming interface is completed.

Figure 10:
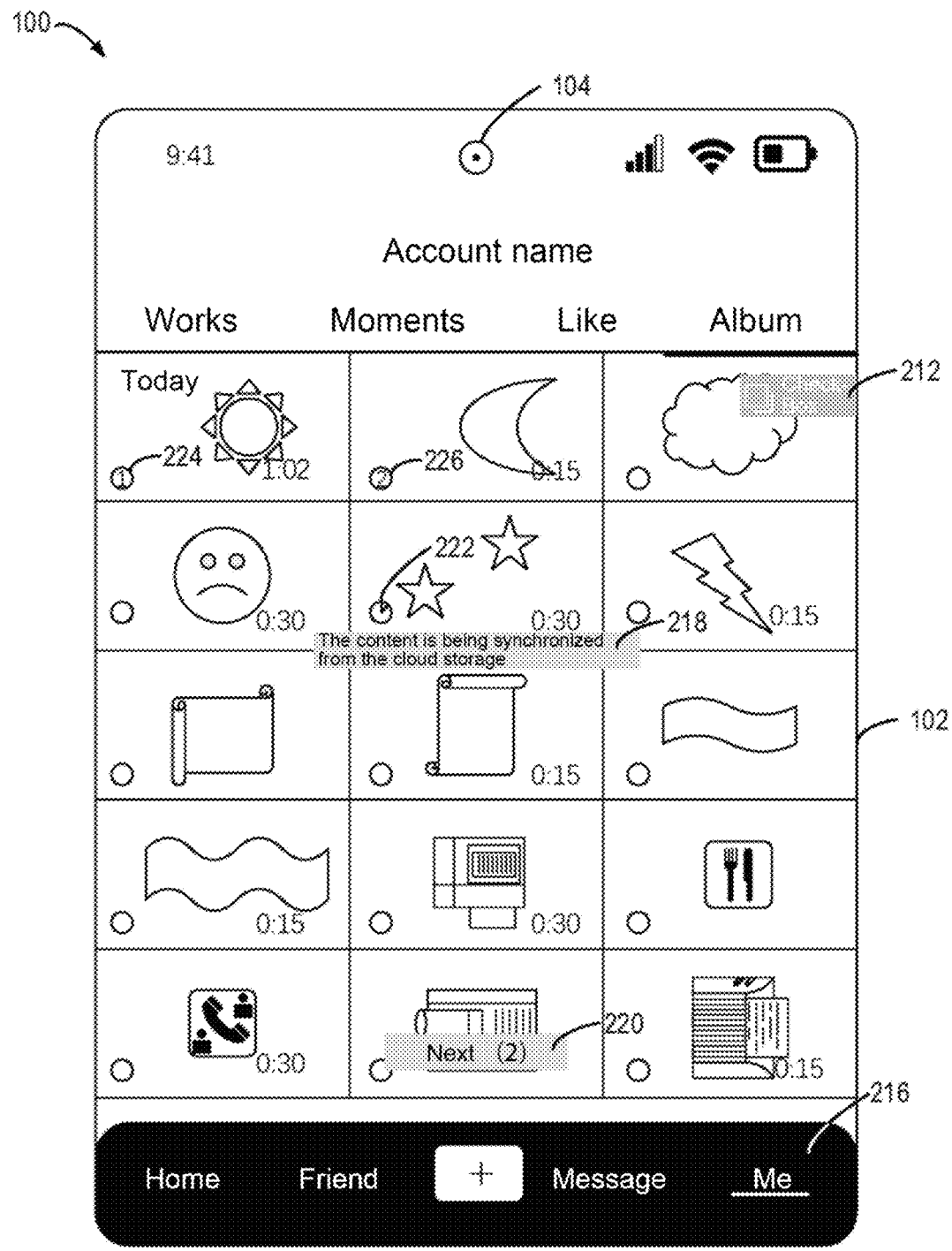
FIG. 10 illustrates an exemplary user interface of an electronic device according to some embodiments of the present disclosure.

As shown in FIG. 9, the user interface comprises a checkbox user interface element 212. The user may activate the checkbox user interface element 212 to enter the checkbox state, as shown in FIG. 10. In the checkbox state, selectable checkboxes are displayed at the videos/images, and when the user selects the video/image, the corresponding number identity may be shown, as indicated by 224 and 226. For example, the number identities may be sequentially numbered according to the order of selection.

When the user has selected at least one work, a "Next" user interface element 220 is presented in the user interface, and optionally the number of works selected by the user is presented in the user interface. After the user clicks on the user interface element 220, enter into the video editing interface. The user may make such as a photo movie and stuck point video in the video editing interface.

In some embodiments, the video and/or image is stored in a cloud album, then when the content is displayed or when the user clicks on the content, the content is downloaded, and "The content is being synchronized from the cloud storage" 218 is displayed, and the progress user interface element 222 is displayed to indicate the download progress. During the download process, the user may still click on the user interface element 220 to enter into the video editing interface.

After the user selects a content, enter into the editing interface. The editing interface may be as shown in FIG. 11. The editing interface shown in FIG. 11 is similar to that shown in FIG. 2, wherein the editing interface may present videos or images 248 in the album. As shown in FIG. 11, the editing interface may comprise a plurality of editing user interface elements, for example, the music selection user interface element 228, the filter user interface element 230, the text user interface element 232, the sticker user interface element 234, the special effect user interface element 236 and so on, which correspond to the music selection user interface element 124, the filter user interface element 128, the text user interface element 130, the sticker user interface element 132, and the special effect user interface element 134 in FIG. 2, respectively. In addition, the user may click on the user interface element 238 to expand more editing user interface elements for additional editing functions. It should be understood that the editing interface may provide more or fewer editing user interface elements.

As shown in FIG. 11, the user interface displays the timestamp of the video or image 248, for example, the capturing time and/or the latest edited time. For example, this operation may be performed on historical images captured a predetermined period of time (for example, 3 days, a week, and so on) ago.

If the user is not satisfied with the effect of the video or image 248, the user may click the returning back to user interface element 240 to return back to the personal album and re-select the video or image. On the other hand, after the user has finished editing the video or image, the posting user interface element 242 may be clicked to post the edited video or image 248. The user may also simply click on the posting user interface element 242 to post the video or image 248 without performing any editing operations. In addition, the editing interface also provides a switching user interface element 244 for switching to a posting interface for posting the video or image, as shown in FIG. 3.

Embodiments for quickly posting the content of a personal album according to some embodiments of the present disclosure are described above with reference to FIGS. 9-11. By providing an album interface, the user may quickly post previously made videos or images, thereby improving user experience and increasing user stickiness.

Figure 12:
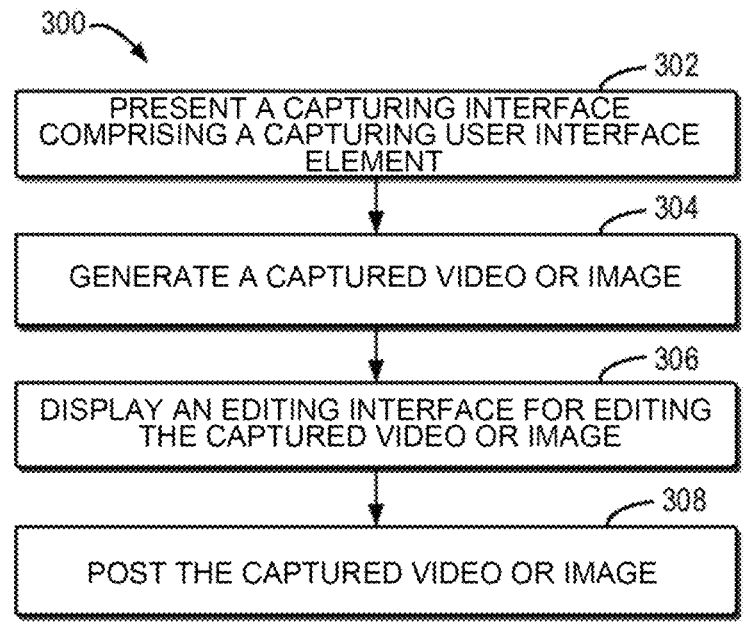
FIG. 12 is a flowchart illustrating a method for posting a video or image according to some embodiments of the present disclosure.

FIG. 12 is a flowchart illustrating a method 300 for posting a video or image, according to some embodiments of the present disclosure. At block 302, a capturing interface (for example, as shown in FIG. 1) that comprises a capturing user interface element (for example, as shown in FIG. 1, such as the capturing user interface element 108) is presented.

At block 304, the captured video or image is generated in response to detecting activation of the capturing user interface element (for example, the capturing user interface element 108 shown in FIG. 1) in the capturing interface.

In some embodiments, generating the captured video or image comprises: in response to detecting a click on the capturing user interface element in the capturing interface (for example, the capturing user interface element 108 shown in FIG. 1), initiating generation of the captured video or image, for example, starting to record a video or capturing an image; while generating the captured video or image, in response to detecting a click on the capturing user interface element in the capturing interface (for example, the capturing user interface element 108 shown in FIG. 1) stopping the generation of the captured video or image, for example, stopping recording the video or capturing the image.

In some embodiments, generating the captured video or image comprises: in response to detecting a press on the capturing user interface element (for example, the capturing user interface element 108 shown in FIG. 1), initiating generation of the captured video or image, for example, starting to record a video or capturing an image; and in response to detecting ceasing of the pression on the capturing user interface element (for example, the capturing user interface element 108 shown in FIG. 1), stopping the generation of the captured video or image, for example, stopping recording the video or capturing the image.

At block 306, an editing interface (as shown in FIG. 2 or FIG. 6) for editing the captured video or image is displayed, the editing interface comprising a posting user interface element for posting the captured video or image (for example, the posting user interface element 140 as shown in FIG. 2 or the posting user interface element 182 as shown in FIG. 6).

At block 308, in response to detecting activation of the posting user interface element (for example, the posting user interface element 140 shown in FIG. 2 or the posting user interface element 182 shown in FIG. 6), the captured video or image is posted.

In some embodiments, the posting user interface element is a first posting user interface element (for example, the posting user interface element 140 shown in FIG. 2), and the method 300 further comprises: in response to detecting activation (for example, clicking on the switching user interface element 142) of a switching user interface element (for example, the switching user interface element 142) in the editing interface (for example, as shown in FIG. 2), displaying a posting interface (for example, as shown in FIG. 3) for posting the captured video or image, the posting interface comprising a second posting user interface element for posting the captured video or image; and in response to detecting activation of the second posting user interface element (for example, the posting user interface element 146 as shown in FIG. 3), posting the captured video or image.

In some embodiments, the editing interface (for example, as shown in FIG. 6) comprises a first set of editing user interface elements for editing the captured video or image. For example, the first set of editing user interface elements comprises at least one of an editing user interface element for selecting a capturing location (for example, location user interface element 188 shown in FIG. 6) or an editing user interface element for selecting a publicity degree (for example, publicity degree user interface elements 190 as shown in FIG. 6.

In some embodiments, the editing interface further comprises an additional user interface element (for example, user interface element 184 shown in FIG. 6) for presenting a second set of editing user interface elements for editing the captured video or image. The method further comprises: in response to detecting activation of the additional user interface element (for example, user interface element 184 shown in FIG. 6) in the editing interface (for example, as shown in FIG. 6), displaying the second set of editing user interface elements (for example, the user interface elements 192, 194, 196, and 198 shown in FIG. 7). For example, the second set of editing user interface elements comprises an editing user interface element for selecting a cover.

In some embodiments, method 300 further comprises: in response to detecting activation of a sticker user interface element (for example, sticker user interface element 132 shown in FIG. 2) in the editing interface, adding a sticker to the captured video or image, the sticker comprising a metadata tag for interaction. For example, the metadata tag comprises at least one of an "@" tag indicating an interactive object or a "#" tag indicating a topic.

In some embodiments, method 300 further comprises displaying an album of a user in a home page of the user; in response to detecting a selection of the video or image in the album displaying an editing interface for editing a video or image; and displaying at least one of a capturing time or a latest modification time of the video or image in the editing interface, as shown in FIG. 11. For example, the album comprises at least one of a local album or a cloud album.

In some embodiments, in response to detecting activation of a filter user interface element in the editing interface, displaying filters available to be added to the captured video or image, the filters being specific to the editing interface comprising the posting user interface element. For example, these filters are specific to the Story mode, as shown in FIG. 4.

Figure 13:
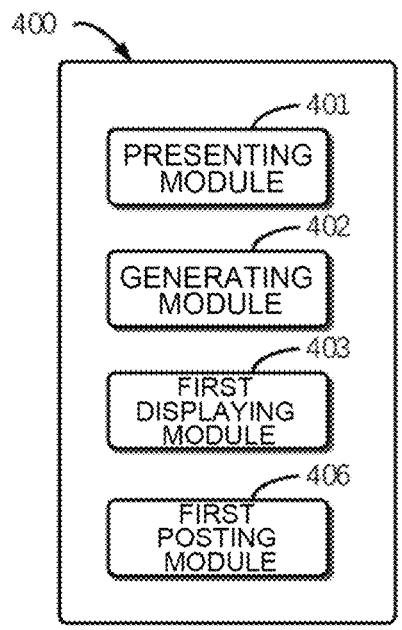
FIG. 13 is a block diagram illustrating an apparatus for posting video or images according to some embodiments of the present disclosure.

FIG. 13 is a block diagram illustrating an apparatus 400 for posting video or images, according to some embodiments of the present disclosure. The apparatus 400 comprises: a presenting module 402 configured to present a capturing interface comprising a capturing user interface element; a generating module 404 configured to in response to detecting activation of the capturing user interface element in the capturing interface, generate a captured video or image; a first displaying module 406 configured to display an editing interface for editing the captured video or image, the editing interface comprising a posting user interface element for posting the captured video or image; and a first posting module 408 configured to in response to detecting activation of the posting user interface element, post the captured video or image.

In some embodiments, the generating module 404 comprises: a first initiating module configured to in response to detecting a click on the capturing user interface element in the capturing interface, initiate generation of the captured video or image; and a first stopping module configured to while generating the captured video or image, in response to detecting a click on the capturing user interface element in the capturing interface stop the generation of the captured video or image.

In some embodiments, the generating module 404 comprises: a second initiating module configured to in response to detecting a press on the capturing user interface element, initiate generation of the captured video or image; and a second stopping module configured to in response to detecting ceasing of the pression on the capturing user interface element, stop the generation of the captured video or image.

In some embodiments, the posting user interface element is a first posting user interface element, and the apparatus further comprises: a second displaying module configured to in response to detecting activation of a switching user interface element in the editing interface, display a posting interface for posting the captured video or image, the posting interface comprising a second posting user interface element for posting the captured video or image; and a second posting module configured to in response to detecting activation of the second posting user interface element, post the captured video or image.

In some embodiments, the editing interface comprises a first set of editing user interface elements for editing the captured video or image.

In some embodiments, the first set of editing user interface elements comprises at least one of an editing user interface element for selecting a capturing location or an editing user interface element for selecting a publicity degree.

In some embodiments, the editing interface further comprises an additional user interface element for presenting a second set of editing user interface elements for editing the captured video or image, and the apparatus further comprises: a third displaying module configured to in response to detecting activation of the additional user interface element in the editing interface, display the second set of editing user interface elements.

In some embodiments, the second set of editing user interface elements comprises an editing user interface element for selecting a cover.

In some embodiments, the apparatus further comprises: an adding module configured to in response to detecting activation of a sticker user interface element in the editing interface, add a sticker to the captured video or image, the sticker comprising a metadata tag for interaction.

In some embodiments, the metadata tag comprises at least one of an "@" tag indicating an interactive object or a "#" tag indicating a topic.

In some embodiments, the apparatus 400 further comprises: a fourth displaying module configured to display an album of a user in a home page of the user; a fifth displaying module configured to in response to detecting a selection of the video or image in the album display an editing interface for editing a video or image; and a sixth displaying module configured to display at least one of a capturing time or a latest modification time of the video or image in the editing interface.

In some embodiments, the album comprises at least one of a local album or a cloud album.

In some embodiments, the apparatus 400 further comprises: a seventh displaying module configured to in response to detecting activation of a filter user interface element in the editing interface, display filters available to be added to the captured video or image, the filters being specific to the editing interface comprising the posting user interface element.

Figure 14:
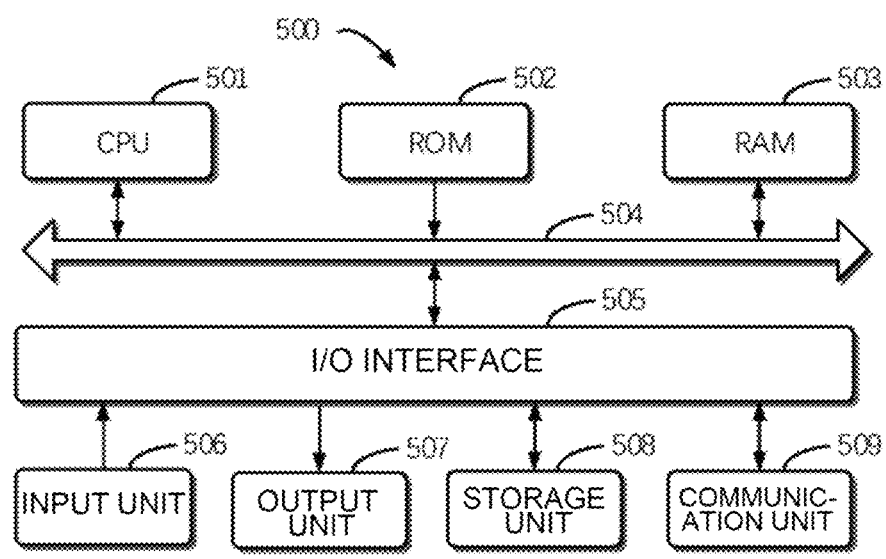
FIG. 14 shows a block diagram of an electronic device capable of implementing some embodiments of the present disclosure.

FIG. 14 shows a block diagram of an electronic device 500 capable of implementing some embodiments of the present disclosure. The electronic device 100 shown in FIG. 1 to FIG. 9 or the apparatus 400 shown in FIG. 13 may be implemented by the device 500. As shown in FIG. 14, device 500 comprises a central processing unit (CPU) 501 that may be loaded into random access memory (RAM) 503 according to computer program instructions stored in read only memory (ROM) 502 or from a storage unit 508 computer program instructions to perform various appropriate actions and processes. In the RAM 503, various programs and data necessary for the operation of the device 500 can also be stored. The CPU 501, the ROM 502, and the RAM 503 are connected to each other through a bus 504. An input/output (I/O) interface 505 is also connected to bus 504.

Various components in the device 500 are connected to the I/O interface 505, including: an input unit 506, such as a keyboard, mouse, and so on; an output unit 507, such as various types of displays, speakers, and so on; a storage unit 508, such as a magnetic disk, an optical disk, e and so on; and a communication unit 509, such as a network card, a modem, a wireless communication transceiver, and so on. The communication unit 509 allows the device 500 to exchange information/data with other devices through a computer network such as the Internet and/or various telecommunication networks.

The various procedures and processes described above, such as method 300, may be performed by the CPU 501. For example, in some embodiments, method 300 may be implemented as a computer software program tangibly embodied on a machine-readable medium, such as storage unit 508. In some embodiments, a portion or all of the computer program may be loaded and/or installed on device 500 via ROM 502 and/or communication unit 509. When a computer program is loaded into RAM 503 and executed by CPU 501, one or more steps of method 300 described above may be performed. Alternatively, in other embodiments, the CPU 501 may be configured to perform method 300 by any other suitable means (for example, by means of firmware).

The present disclosure may be a method, apparatus, system and/or computer program product. A computer program product may include a computer-readable storage medium having computer-readable program instructions loaded thereon for carrying out various aspects of the present disclosure.

A computer-readable storage medium may be a tangible device that can hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory sticks, floppy disks, mechanically coded devices, such as printers with instructions stored thereon Hole cards or raised structures in grooves, and any suitable combination of the above. Computer-readable storage media, as used herein, are not to be construed as transient signals per se, such as radio waves or other freely propagating electromagnetic waves, electromagnetic waves propagating through waveguides or other transmission media (for example, light pulses through fiber optic cables), or through electrical wires transmitted electrical signals.

The computer readable program instructions described herein may be downloaded to various computing/processing devices from a computer readable storage medium, or to an external computer or external storage device over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for carrying out operations of the present disclosure may be assembly instructions, instruction set architecture (ISA) instructions, machine instructions, machine-dependent instructions, microcode, firmware instructions, state setting data, or instructions in one or more programming languages. Source or object code written in any combination, including object-oriented programming languages, such as Smalltalk, C++, and so on, and conventional procedural programming languages, such as the "C" language or similar programming languages. The computer readable program instructions may execute entirely on the computer of the user, partly on the computer of the user, as a stand-alone software package, partly on the user's computer and partly on a remote computer, or entirely on the remote computer or server implement. In the case of a remote computer, the remote computer may be connected to the computer of the user through any kind of network, including a local area network (LAN) or a wide area network (WAN), or may be connected to an external computer (for example, using an Internet service provider through the Internet connect). In some embodiments, custom electronic circuits, such as programmable logic circuits, field programmable gate arrays (FPGAs), or programmable logic arrays (PLAs), can be personalized by utilizing state information of computer readable program instructions. Computer readable program instructions are executed to implement various aspects of the present disclosure.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to the processing unit of a general purpose computer, special purpose computer or other programmable data processing device to produce a machine that causes the instructions when executed by the processing unit of the computer or other programmable data processing device, resulting in means for implementing the functions/acts specified in one or more blocks of the flowchart and/or block diagrams. These computer readable program instructions can also be stored in a computer readable storage medium, these instructions cause a computer, programmable data processing apparatus and/or other equipment to operate in a specific manner, so that the computer readable medium storing the instructions comprises an article of manufacture comprising instructions for implementing various aspects of the functions/acts specified in one or more blocks of the flowchart and/or block diagrams.

Computer-readable program instructions can also be loaded onto a computer, other programmable data processing apparatus, or other equipment to cause a series of operational steps to be performed on the computer, other programmable data processing apparatus, or other equipment to produce a computer-implemented process, thereby causing instructions executing on a computer, other programmable data processing apparatus, or other device to implement the functions/acts specified in one or more blocks of the flowcharts and/or block diagrams.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of instructions, which comprises one or more functions for implementing the specified logical function(s) executable instructions. In some alternative implementations, the functions noted in the blocks may occur out of the order noted in the figures. For example, two blocks in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or actions, or can be implemented in a combination of dedicated hardware and computer instructions.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to best explain the principles of the embodiments, the practical application or improvement over the technology in the marketplace, or to enable others of ordinary skill in the art to understand the embodiments disclosed herein.

What is claimed is:

1. A method of posting a video or image, comprising:
presenting a capturing interface comprising a capturing user interface element;
in response to detecting activation of the capturing user interface element in the capturing interface,
generating a captured video or image;
displaying an editing interface for editing the captured video or image, the editing interface comprising:
a filter user interface element; and
a posting user interface element for posting the captured video or image;
in response to detecting activation of the posting user interface element, posting the captured video or image; and
in response to detecting activation of the filter user interface element, displaying a filter applicable for the captured video or image, wherein
the editing interface corresponds to a first capturing mode, and
the filter displayed in the editing interface is not applicable for a second capturing mode different from the first capturing mode.

2. The method of claim 1, wherein generating the captured video or image comprises:
in response to detecting a click on the capturing user interface element in the capturing interface, initiating generation of the captured video or image; and
while generating the captured video or image, in response to detecting a click on the capturing user interface element in the capturing interface stopping the generation of the captured video or image.

3. The method of claim 1, wherein generating the captured video or image comprises:
in response to detecting a press on the capturing user interface element, initiating generation of the captured video or image; and
in response to detecting ceasing of the pression on the capturing user interface element, stopping the generation of the captured video or image.

4. The method of claim 1, wherein the posting user interface element is a first posting user interface element, and the method further comprises:
in response to detecting activation of a switching user interface element in the editing interface, displaying a posting interface for posting the captured video or image, the posting interface comprising a second posting user interface element for posting the captured video or image; and
in response to detecting activation of the second posting user interface element, posting the captured video or image.

5. The method of claim 1, wherein the editing interface comprises a first set of editing user interface elements for editing the captured video or image.

6. The method of claim 5, wherein the first set of editing user interface elements comprises at least one of an editing user interface element for selecting a capturing location or an editing user interface element for selecting a publicity degree.

7. The method of claim 5, wherein the editing interface further comprises an additional user interface element for presenting a second set of editing user interface elements for editing the captured video or image, and the method further comprises:

in response to detecting activation of the additional user interface element in the editing interface, displaying the second set of editing user interface elements.

8. The method of claim 7, wherein the second set of editing user interface elements comprises an editing user interface element for selecting a cover.

9. The method of claim 1, further comprising:

in response to detecting activation of a sticker user interface element in the editing interface, adding a sticker to the captured video or image, the sticker comprising a metadata tag for interaction.

10. The method of claim 9, wherein the metadata tag comprises at least one of an "@" tag indicating an interactive object or a "#" tag indicating a topic.

11. The method of claim 1, further comprising:

displaying an album of a user in a home page of the user;

in response to detecting a selection of the video or image in the album displaying an editing interface for editing a video or image; and displaying at least one of a capturing time or a latest modification time of the video or image in the editing interface.

12. The method of claim 11, wherein the album comprises at least one of a local album or a cloud album.

13. An electronic device, comprising:

a processor; and a memory for storing a computer program, the computer program being executed by the processor to implement the method according to claim 1.

14. A non-transitory computer-readable storage medium storing a computer program thereon, wherein the computer program is executed by a processor to implement the method according to claim 1.

15. The method of claim 1, wherein the capturing interface further comprises an album interface element, and the method further includes:

in response to detecting activation of the album interface element, displaying at least one of videos or images in an album in a thumbnail manner, and displaying a timestamp of at least one of the following: at least one of the videos, or at least one of the images.

16. The method of according to claim 15, wherein the timestamp changes as the album slides.

17. The method of according to claim 1, wherein the filter has a following-hand effect, and the following-hand effect comprises, as a gesture slides, an interactive effect of a selected filter that is applied to a part of the captured video or image before lifting.

* * * * *